Nov. 24, 1953          N. W. BERGLIND          2,660,210
    MACHINE OF THE HOUSEHOLD TYPE FOR CUTTING, MASHING, AND
          WHIPPING FRUITS, VEGETABLES, AND THE LIKE
                   Filed Jan. 15, 1951
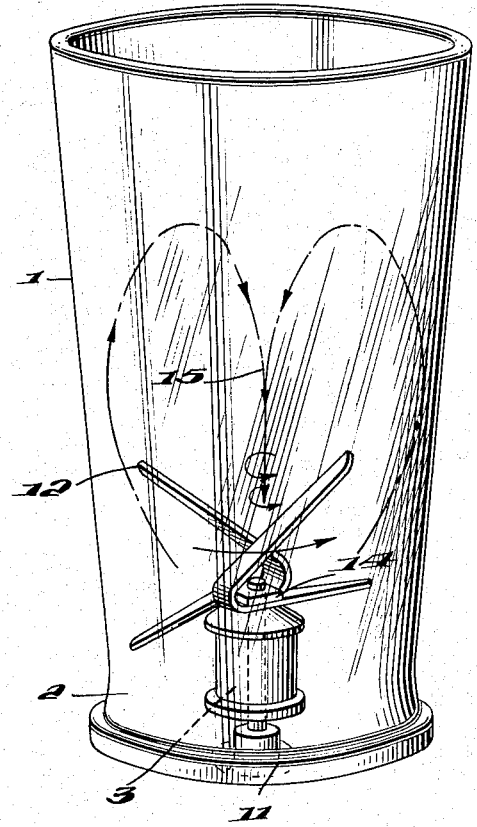
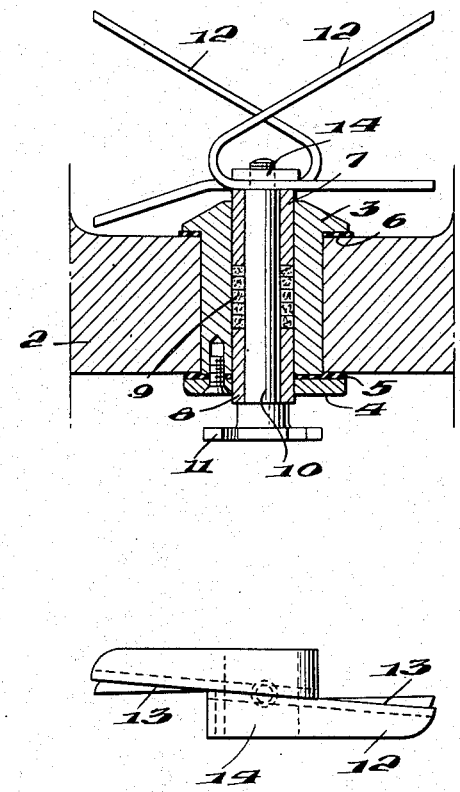
INVENTOR
Nils Wilhelm Berglind
BY Pierce, Scheffler & Parker
ATTORNEYS Patented Nov. 24, 1953

2,660,210

UNITED STATES PATENT OFFICE 2,660,210

MACHINE OF THE HOUSEHOLD TYPE FOR CUTTING, MASHING, AND WHIPPING FRUITS, VEGETABLES, AND THE LIKE

Nils Wilhelm Berglind, Stureby, Sweden

Application January 15, 1951, Serial No. 206,089

Claims priority, application Sweden January 16, 1950

3 Claims. (Cl. 146—68)

The present invention refers to machines of the household type for cutting, mashing and whipping fruits, vegetables and the like and comprising a knife device arranged at a bottom of a receptacle on a rotating, preferably motor-driven shaft.

In previously known types of household machines of the kind set forth, the knife device generally consists of horizontal and/or obliquely upwardly or downwardly directed knife blades extending from a rotating hub, said knife blades being tightened onto the hub by means of a centrally arranged nut, which obviously does not have any cutting effect during the rotary movement of the knife structure. This involves that parts of the material to be disintegrated may remain at the center where they will ride on the nut. Furthermore, it is required that liquid be supplied to create a circulation so as to permit disintegration of the whole mass of the material subjected to treatment.

The object of the present invention is to avoid these drawbacks, and this object in view is attained by the fact that the knife device is constituted by knife blades the cutting edges of which are arranged to run through the center of rotation. In a knife device of this description, the material to be disintegrated is sucked down toward the cutting device and is seized here at once by the cutting edges running up to and into the center of rotation to disintegrate the material. No admixture of liquid is required, a sucking and outwardly ejecting effect being obtained on account of the formation of the knives, so that the whole mass is brought into circulation to become disintegrated continuously into progressively finer particles.

A knife device according to the invention will be described hereinbelow with reference to the accompanying drawing, wherein Fig. 1 is a perspective view of a knife device according to a form of embodiment of the invention, the same being mounted on a shaft rotating within a receptacle. Fig. 2 shows a vertical section through the knife device and its attaching means, and Fig. 3 shows the knife device viewed from above.

The knife device is mounted in an upwardly open, preferably upwardly conically flaring cup 1 from glass, plastic or some other suitable material. A liquid-tight bearing contrivance is arranged in the bottom 2 of the cup 1, a portion of said bottom being shown in greater detail and to a larger scale in Fig. 2. This bearing contrivance is constituted by a bushing 3 bearing with a flange against the upper surface of the bottom of the cup and being secured by a washer 4 and by means of screws to the lower side of the bottom of the cup. Rubber packings 5 and 6 provide for the requisite tightening effect between the bushing and the bottom of the cup. The bushing 3 has two self-lubricating frictional bearings 7 and 8 inserted therein, in a manner, such that a space is provided between the bearings within the bushing 3. Arranged in this space are felt rings 9 impregnated with lubricating oil to maintain the oil quantity in the self-lubricating bearings. A shaft 10 is rotatably fitted into the bearings 7, 8 and carries in its lower portion a coupling disk 11 intended to engage a corresponding coupling member of an electric motor, not shown in the drawing. The upper portion of the shaft 10 has the knife device secured thereto.

The knife device is constituted by a couple of angularly bent knife blades 12, the cutting edges 13 of which run through the center of rotation of the knife device. Each knife blade consists of a metal strip angularly bent to the shape of a V, one shank of said V-strip being horizontal or bent somewhat downwardly, whereas the other shank extends in a direction obliquely upwards. The two knife blades are rigidly connected with a plate 14 near the point of connection of the shanks, said plate being provided with a threaded aperture intended to receive the correspondingly threaded end portion of the shaft 10. The two knife blades may also be made integral from a single piece of sheet metal slitted inwardly toward the center of rotation, so that a piece of sufficient size remains for the securing of the knife structure onto the shaft. The slitted portions are then bent in accordance with the figures of the drawing.

In the use of the knife device the cup 1 is placed on a frame containing a driving motor imparting rapid rotary movement of about 10,000—15,000 revolutions per minute to the knife blades. Owing to the formation of the knife blades, the material to be disintegrated is hurled outwardly toward the sides of the cup, following these upwardly and being then sucked down toward the center of rotation of the knife blades. This circulation is indicated by the paths 15 drawn in Fig. 1. Owing to the fact that the edges of the knife blades run inwardly toward the center of rotation, no parts of the material will remain here, but will be subjected to disintegration. The mass is divided more and more, and the desired consistency having been reached the driving motor is brought to a stillstand.

The knife device hereinbefore described and illustrated in the drawing only forms an example of embodiment of the invention, permitting of being modified in its construction and details, without the principle of the invention being departed from.

What I claim is:

1. In a machine of the household type for cutting, mashing and whipping fruits, vegetables and the like comprising a receptacle and a knife device secured to the upper end of a rotary shaft at the bottom of said receptacle, the improvement wherein said knife device includes a pair of blades each having a cutting edge, said blades being attached at their lower ends to the upper end of said shaft and including portions extending inward and obliquely upward from said lower ends towards and extending beyond the axis of said shaft, the respective cutting edges of said blades being contained in a common plane which also contains said axis, and said edges passing through and crossing each other at said axis substantially above the end of the shaft.

2. A machine of the type as defined in claim 1 wherein said blades terminate in free upper ends.

3. A machine of the type as defined in claim 1 wherein each of said blades includes a second portion extending outwardly from the lower end thereof at substantially a right angle to the axis of said shaft.

NILS WILHELM BERGLIND.

References Cited in the file of this patent

UNITED STATES PATENTS

| Number | Name | Date |
|---|---|---|
| 856,295 | Prindle | June 11, 1907 |
| 1,166,867 | Takamine | Jan. 4, 1916 |
| 2,226,372 | Cravaritis | Dec. 24, 1940 |
| 2,315,018 | Lawrence | Mar. 30, 1943 |
| 2,335,002 | Eppenbach | Nov. 23, 1943 |
| 2,496,780 | Nardis et al. | Feb. 7, 1950 |
| 2,576,802 | Morris | Nov. 27, 1951 |

FOREIGN PATENTS

| Number | Country | Date |
|---|---|---|
| 511,935 | Great Britain | Aug. 25, 1939 |